(No Model.)
J. J. C. SMITH.
MANUFACTURE OF ELECTRIC CABLES.
No. 343,083. Patented June 1, 1886.
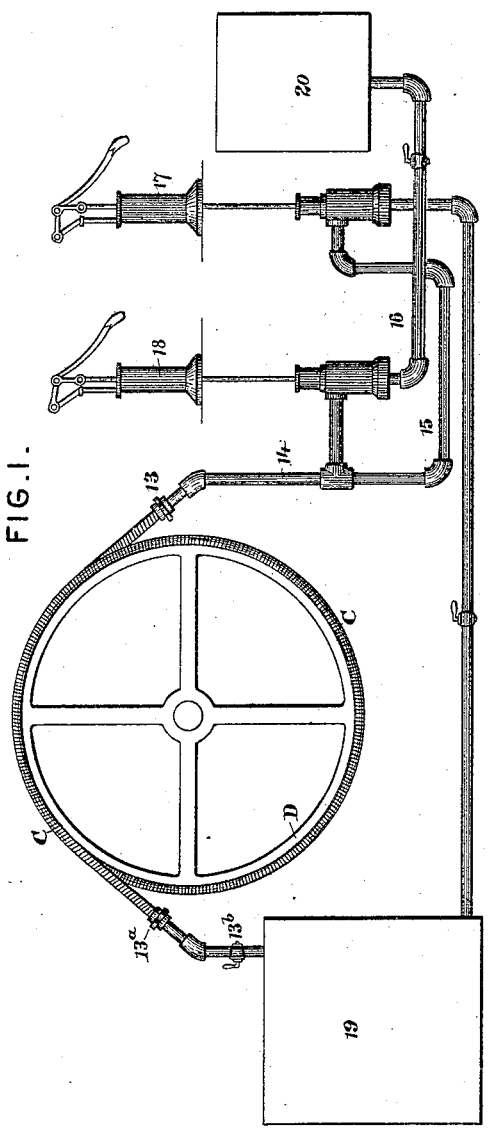
FIG. I.
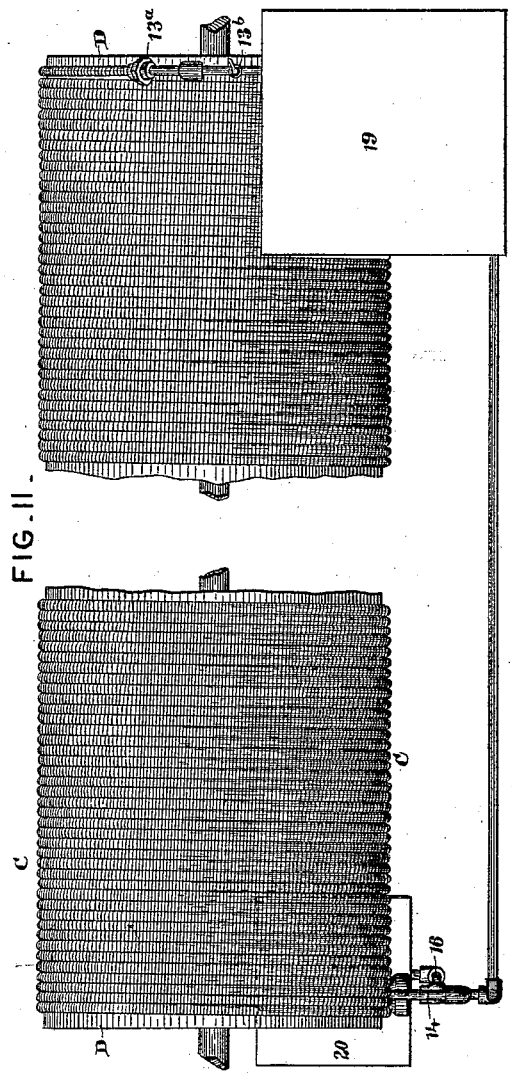
FIG. II.
Attest:
Geo. T. Smallwood
Edward Steer
Inventor:
John J. C. Smith
By Knight Bros
attys

UNITED STATES PATENT OFFICE.

JOHN JOSEPH CHARLES SMITH, OF PASSAIC, NEW JERSEY, ASSIGNOR TO JOHN H. CHEEVER, OF NEW YORK, N. Y.

MANUFACTURE OF ELECTRIC CABLES.

SPECIFICATION forming part of Letters Patent No. 343,083, dated June 1, 1886.

Application filed March 26, 1886. Serial No. 196,703. (No model.)

*To all whom it may concern:*

Be it known that I, JOHN JOSEPH CHARLES SMITH, a citizen of the United States, residing at Passaic, in the county of Passaic and State of New Jersey, have invented a new and useful Improvement in the Manufacture of Electric Conducting-Cables, of which the following is a specification.

The object of this invention is to produce a cable of multiple conductors possessing the necessary flexibility, with effective insulation between the different conductors and with reference to extraneous influences. To these ends I construct my improved cable with a hollow core, preferably of coiled wire, around which I apply any desirable number of fine conducting-wires wound in long spiral coils, said wires being previously covered with cotton or other fibrous material, over which I coil an envelope of tape coated on the outside with india-rubber, and around this a vulcanizable envelope, which when vulcanized forms an impervious covering. This is preferably protected by sheet metal and also with tape; and, if the cable is to be laid under ground, with a double wire armor, as I have described in an earlier application for Letters Patent. The hollow cable thus made is then filled with any suitable fusible non-conducting substance—such as paraffine, ozocerite, rosin, or a mixture of these ingredients; but in order to insure the permeation of the fusible insulating material throughout the fibrous coverings of the wires and filling the spaces around and between the said wires and within the hollow core of the cable it is necessary to first heat the whole interior of the cable, for which purpose I introduce under pressure a stream of paraffine-oil heated to about 250° Fahrenheit, which is forced through the cable for a period of twenty or thirty minutes, (more or less,) until the whole interior becomes thoroughly heated, serving to carry off all the air and fully saturate the fibers. This being effected, the melted wax or other insulating material is forced through after the oil, carrying off the paraffine-oil and completely filling the interior of the cable and the spaces between the wires and permeating the fibrous covering.

In the accompanying drawings, Figure I is an elevation of an apparatus by which my invention may be carried into effect, showing the end of the reel or drum. Fig. II is a front elevation of the reel or drum with the cable coiled around it.

C represents a hollow cable, which may be constructed as above described, and coiled on a drum, D, in lengths of one thousand feet, (more or less.)

13 represents a coupling by which one end of the cable is connected with pipes 14 15 16, for exhausting the air and forcing the oil through it and subsequently filling it with melted wax, as above described.

17 represents a forcing-pump connecting with a tank, 19, for containing heated paraffine-oil; and 18, a forcing-pump connecting with the tank 20, in which the hot paraffine-wax is contained.

In operation paraffine-oil heated to at least 250° Fahrenheit is by the action of the pump 17 taken from the tank 19 and forced through the cable for twenty or thirty minutes, until the entire length of the hollow cable is thoroughly heated and prepared for receiving the melted insulating compound from the tank 20. This hot insulating material is then by the pump 18 forced into the cable, expelling the oil before it until the whole interior of the cable is filled, as before explained, with fusible insulating material adapted to congeal at a temperature of 140° Fahrenheit, (more or less.) Such of the paraffine-oil as remains in the fibrous coverings of the wires will readily mix with the melted insulating-wax when pressure is applied, the oil of itself being a good insulating material, and when mixed with the wax forming a composition of sufficient solidity for the purpose. Pressure is applied to the melted material by means of the force-pump, which may be brought to about two hundred pounds to the square inch, so as to make sure that the melted material will penetrate into every interstice and pore which may exist between the wires, threads of cotton, and the outside covering. For this purpose a coupling, 13ª, and nozzle with a cock, 13ᵇ, may be applied to the discharge end of the cable. The cable is then allowed to cool off to solidify the wax or other insulating body, and is ready for use.

If the cable be designed for aerial use, where lightness is a desideratum, a strong hemp cover is substituted for the metal armor for the purpose of preventing the bursting of the rubber envelope by internal pressure and protecting the cable from external injury.

Having thus described my invention, the following is what I claim as new therein and desire to secure by Letters Patent:

1. The process of making electric cables substantially as herein described, the same consisting in laying any desirable number of conducting-wires with fibrous coverings around a hollow core having passages in its walls, enveloping the said body of conductors in an impervious envelope, forcing heated liquid through the cable to remove the air and heat the interior, and subsequently forcing in insulating material in a melted state to fill the interstices between the conducting-wires.

2. The process herein described for insulating wires in electric cables, the same consisting in forcing through a hollow cable a current of heated oil to heat the interior and expel air therefrom, and then forcing in a body of melted insulating material to displace the oil, as explained.

3. The apparatus for filling hollow electric cables, consisting of one or more forcing-pumps, separate tanks for containing heated oil and melted insulating-wax or like material, and suitable pipe-connections, couplings, and stop-cocks to permit the injection of hot oil and melted wax successively, as explained.

4. The combination of the reel D, a cable, C, coiled thereon, a forcing-pump, 18, tanks 19 and 20, respectively, for oil and wax or the like, and suitable pipe-connections and stop-cocks to enable the successive injection of oil and insulating material into the cable, as explained.

5. The combination of the tanks 19 and 20, pumps 17 and 18, and pipes 14 15 16, provided with suitable stop-cocks and couplings, substantially as and for the purposes set forth.

JOHN JOSEPH CHAS. SMITH.

Witnesses:
JOHN B. PUDNEY,
W. A. WILLIAMS.